United States Patent

Shock

[15] 3,705,638
[45] Dec. 12, 1972

[54] AUXILIARY DRIVE AND SUPPORT MECHANISM FOR MOBILE VEHICLES

[72] Inventor: John P. Shock, 15120 Charlevoix, Grosse Pointe Park, Mich. 48236

[22] Filed: May 26, 1971

[21] Appl. No.: 147,058

[52] U.S. Cl. ............... 180/14 A, 180/11, 180/53 D, 180/66 R, 280/475
[51] Int. Cl. .............................................. B60k 25/04
[58] Field of Search ....... 180/14 R, 14 A, 14 B, 14 C, 180/14 D, 14 E, 11, 12, 13, 53 D, 25 R, 65, 70 R; 280/475, 476 R; 56/16.9, 11.8

[56] References Cited

UNITED STATES PATENTS

| | | | |
|---|---|---|---|
| 3,439,764 | 4/1969 | Kimball | 180/12 |
| 3,233,766 | 2/1966 | Clausen | 280/475 X |
| 3,612,202 | 10/1971 | Moon, Jr. | 180/66 R |
| 3,625,076 | 12/1971 | Hoff | 180/33 B |
| 2,620,612 | 12/1952 | Eugenio | 180/25 R X |

Primary Examiner—Benjamin Hersh
Assistant Examiner—John P. Silverstrim
Attorney—Cullen, Settle, Sloman & Cantor

[57] ABSTRACT

In conjunction with a two-wheeled vehicle having a tongue for connection to a pulling vehicle and having a self contained motor assembly with a power output means; an improved independent drive and support therefore which includes a support bar pivoted on said tongue and secured thereto mounting a transmission housing having a power driven output shaft driving a ground engaging support wheel; there being a hydraulic motor on said housing having an output connected to said output shaft and an auxiliary power take off on said motor assembly connected to a pump and with conduits interconnecting said pump and hydraulic motor.

6 Claims, 4 Drawing Figures

PATENTED DEC 12 1972 3,705,638

INVENTOR
JOHN P. SHOCK
BY Cullen, Settle, Sloman & Cantor
ATTORNEYS

3,705,638

AUXILIARY DRIVE AND SUPPORT MECHANISM FOR MOBILE VEHICLES

BACKGROUND OF THE INVENTION

Heretofore, with mobile vehicles having a frame and a pair of wheels and mounting a self contained motor assembly adapted for operating a work mechanism, such as a stump remover, a power saw or a cement mixer, these vehicles normally have connected to their frame a forwardly extending tongue which is adapted for connection to a pulling vehicle for transfer to the site of use. Often times, at the site of use, the vehicle is disconnected from the pulling vehicle and must be moved over a ground surface to the exact location of operation. Since these devices are considerably heavy, it is difficult to manually move the vehicle over an irregular ground surface.

BRIEF DESCRIPTION OF THE INVENTION

It is an object of the present invention to provide in conjunction with such mobile vehicle which has a self contained motor assembly, an improved independent power operated drive and third point support for the vehicle which is adapted for connection to a suitable power take off on the vehicle motor assembly and with a suitable transmission means whereby, driving power is delivered to the third support wheel by which the vehicle may be moved along the ground surface when disconnected from the pulling vehicle.

It is another object to provide improved drive mechanism and support for such a vehicle wherein, a third wheel support bar is pivotally mounted upon the tongue and may be tipped upwardly out of engagement with the ground surface when the vehicle is being towed and which may be tipped downwardly of the tongue to supportably and drivingly engage the ground surface when the vehicle has been disconnected from a pulling vehicle.

It is another object of the present invention to provide in conjunction with said third support wheel bar, a transmission housing which includes a power driven output shaft for mounting a drive wheel which also serves as a third point of support for the vehicle and wherein, the transmission housing includes a hydraulic motor with suitable drive means interconnecting the hydraulic motor and the output shaft and wherein, a hydraulic pump is mounted upon the vehicle suitably connected to an auxiliary power take off on its self contained motor assembly and, wherein, suitable hydraulic connections are provided between the hydraulic pump and the hydraulic motor to thus provide independent means for movably driving the vehicle upon the ground surface when disconnected from the pulling vehicle.

These and other objects will be seen from the following specification and claims in conjunction with the appended drawing in which:

DETAILED DESCRIPTION OF THE INVENTION

Figure 1:
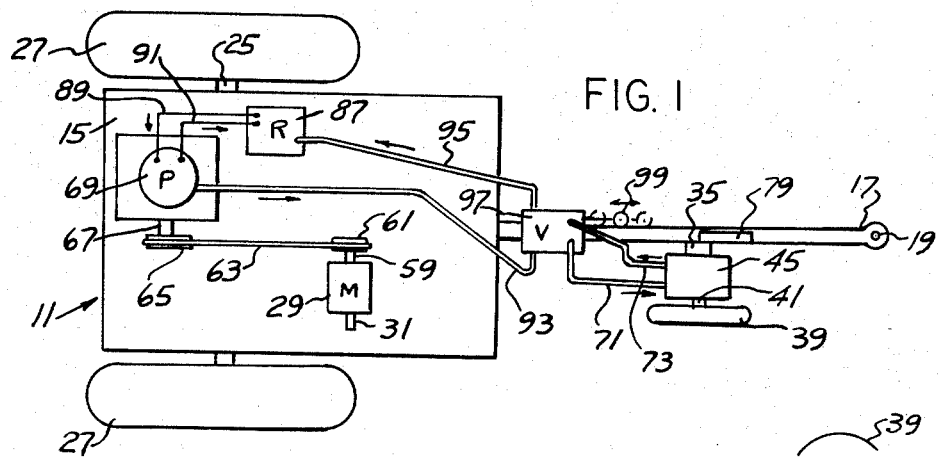
FIG. 1 is a fragmentary plan view of the present mobile vehicle mounting a self contained motor assembly schematically shown.

Referring to the drawing, the present mobile vehicle generally indicated at 11 includes a frame 13, a platform 15 upon the frame and extending from said frame a forwardly arranged tongue 17 suitably apertured at 19. The tongue is adapted for connection to a pulling vehicle as at T, fragmentarily shown in FIG. 1, there being a suitable apertured means 23 adapted to register with tongue aperture 19. A suitable axle 25 depends from said frame and mounts a pair of laterally spaced wheels 27 engageable with and movable over the ground surface G. Schematically shown at 29 is a self contained motor assembly suitably mounted upon the platform 15 and having a normal output shaft 31 which may be connected to a stump remover, a power saw or a cement mixer or for that matter for any other work mechanism which is movably positioned upon said frame work and has the characteristic of including self contained motor assembly which has power output means as at 31 for operating a suitable work mechanism.

In the present illustrative embodiment, the work mechanism is a stump remover or stump cutter through the present invention is not limited to that specific apparatus.

It does happen in this area in the use of stump cutters, for example, though not limited thereto, that these vehicles are normally drawn by pulling vehicle T to a work site after which they are disassembled as at 19-23. Very often a vehicle must be moved a distance over an irregular surface. Since these vehicles are heavy, much difficulty has existed in transporting the vehicle over the ground surface supporting the vehicle by the tongue 17.

Figure 2:
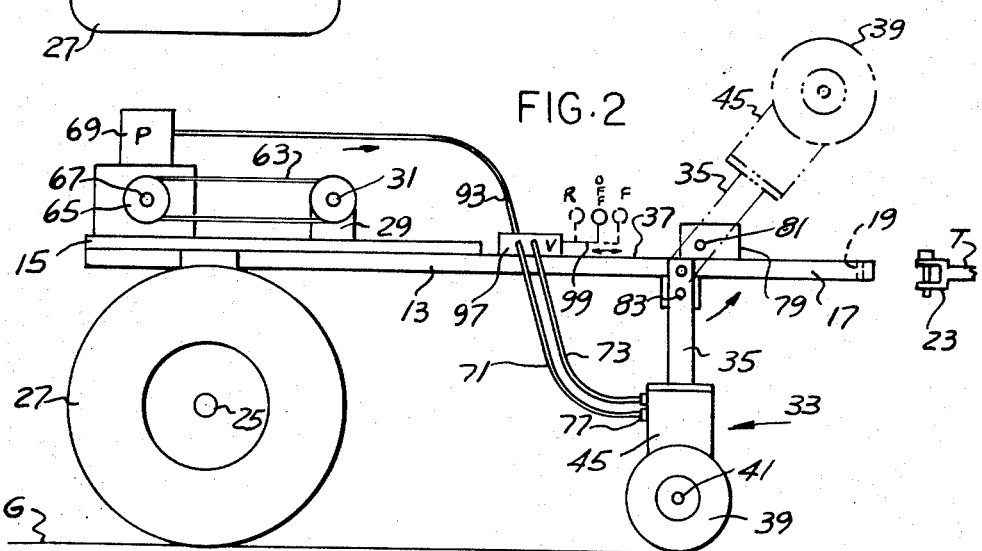
FIG. 2 is a side elevational view thereof.

The present improvement is for vehicles of this type in conjunction with the conventional vehicle above described, there is provided a third wheel drive assembly generally indicated at 33, which when not in use, is shown in the dotted line elevated position, FIG. 2.

When the pulling vehicle is disconnected from tongue 17, the third wheel drive and support assembly 33 is tilted to the substantially upright support and ground engaging and driving position shown in FIG. 2.

This auxiliary third wheel support and drive assembly includes an elongated support bar 35 which is pivotally connected at 37 to the tongue and at its lower end portion, supports ground surface engaging drive wheel 39. Said wheel is secured upon power drive output shaft 41 which is journalled and supported through bearings 43 within the transmission housing 45, FIGS. 3 and 4.

Said housing is aligned with and secured to the lower end portion of bar 35 by fasteners 47 and mounts upon its interior a suitable and conventional hydraulic motor 49. Its output shaft 51 by virtue of certain interconnected driving means connects with and drivingly engages output shaft 41. For this purpose, and for illustration, sprocket 53 keyed to output shaft 51, through the sprocket chain 55 drivingly connects the enlarged sprocket 57 keyed to output shaft 41. It is contemplated that any equivalent power transmission means could be employed for interconnecting hydraulic motor output shaft 51 and the output shaft 41, such as gearing or pulleys.

Provided upon the schematically shown self contained motor assembly 29 is an auxiliary output shaft 59 driving a pulley 61 or equivalent mechanism, which through a suitable belt 63, drives the pulley 65 on input shaft 67 of the hydraulic pump 69.

Any equivalent power transmitting means may be provided as an alternate and equivalent construction between auxiliary power take off shaft 59 and hydraulic pump input shaft 67 as for example, sprocket gears and chain or other gearing and the like.

Figure 4:
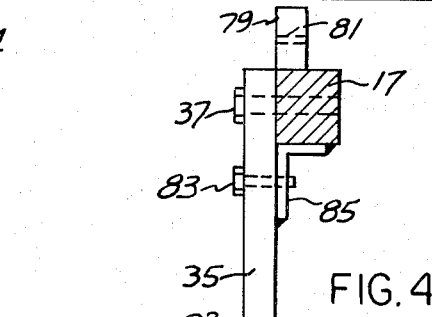
FIG. 4 is a fragmentary section taken in the direction of arrows 4—4 of FIG. 3.

Block 79 apertured at 81, FIG. 4, is mounted above and upon the tongue 17 and is adapted to receive fastener 83 when the auxiliary support and drive assembly has been tilted to the dotted line, non-use position shown in FIG. 2. It is in this position that the drive assembly remains when the vehicle 11 is connected to and drawn by pulling vehicle.

Bracket 85 is secured to bar 85 directly below tongue 17 and is adapted to receive the pin or fastener 83 for anchoring and securing the support bar 35 in the upright position such that the wheel 39 drivingly engages the ground surface.

From the foregoing detailed description, it is seen that the present invention is directed to an improvement for a mobile vehicle of the type described which has its own built in or self contained motor assembly such as a gasoline engine for example, but which is capable of providing power operated means for the control and operation of a work mechanism such as a tool, like a stump cutter, a saw, or a cement mixer for illustration only.

It is contemplated that as the tongue is disassembled from the towing vehicle T, such as shown at FIG. 2, that there be a third point of support for vehicle 11 as well as an auxiliary drive means designated at 33.

Figure 3:
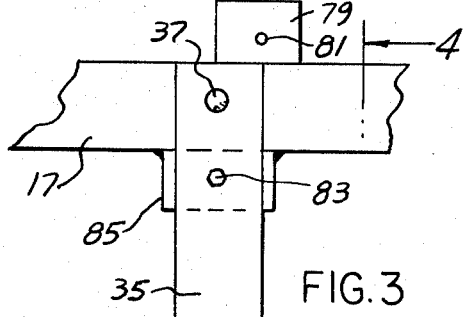
FIG. 3 is a fragmentary partly broken away and sectioned side elevational view of the auxiliary support and drive means for the vehicle, on an increased scale.

With the auxiliary drive means tilted downwardly to the use position, FIGS. 2, 3 and 4, and secured in position by pin or fastener 83, the self contained motor assembly 29 is itself used with an auxiliary power take off as at 59 for controlling the drive movements of the third support wheel 39.

In the illustrative embodiment of the invention, there is provided a suitable hydraulic pump 69 which through conduits 89 and 91 is connected to liquid reservoir 87. Liquid under pressure from pump 69 is delivered through conduit 93 to off and on reverse valve 97 having manual control 99.

In the intermediate position of control 99 shown in solid lines, the valve is shut off so that with the pump operating fluid is merely circulated through conduits 89 and 91 between the pump and reservoir 87.

Interconnecting valve 97 and the fluid motor 49 are a pair of fluid delivery and return conduits 71 and 73 for driving said hydraulic motor. It is noted that the control 99 for said valve has one position to the right for effecting forward control marked F in the drawing and has another position to the left of the central position for reversing said motor indicated by the letter R in the drawing, FIG. 2.

Thus, the valve 97 with the control in the central position, cuts off flow through the valve and in either of the other two positions of the control element 99, directs the flow of fluid to either of the conduits 71 and 73 returning exhaust from the fluid motor back to the valve and from the valve to conduit 95 directly to the reservoir 87 completing the circuit.

Reservoir 87 is schematically shown, as is also the two way off and on control valve 97. Motor output shaft 51 is suitably connected to the housing output shaft 41 and driving wheel 39. Any suitable means may be employed for connecting the auxiliary output shaft 59 to the input shaft 67 of the hydraulic pump in FIG. 1.

OPERATION

In operation, in the position of the vehicle parts shown in FIG. 2 with the auxiliary support and drive wheel in position on the ground surface, the vehicle is capable of slow movements over an irregular or other ground surface to thus, take away the strain of manual movement of the vehicle over such ground surface and at the same time, maintain a third point of support.

It is contemplated as a part of the present invention that while the hydraulic motor 49 has been referred to as the indirect means for driving the ground engaging wheel 39, it is contemplated as equivalent that such motor could be an air motor or an electric motor, each of which would have an output drivingly connected to the output shaft for the wheel 39, each of which would have a corresponding input means for transmitting power to the power driven means.

Having described my invention, reference should now be had to the following claims.

I claim:

1. In a mobile vehicle having a frame, a self contained motor assembly having power operated means for driving a work mechanism with wheels on the frame and a pulling tongue extending forwardly of said frame adapted for support upon and connection to a towing vehicle;

the improvement comprising a support bar pivotally mounted upon said tongue intermediate its ends, normally elevated when the tongue is connected to a pulling vehicle, and when disconnected from the towing vehicle, extending downwardly;

a transmission housing upon said bar mounting a power driven output shaft;

a drive and support wheel on said shaft;

power driven means on said housing having an output drivingly connected to said output shaft;

an input means on said power driven means;

an auxiliary power take off on said vehicle motor assembly;

and motive means interconnecting said auxiliary power take off and said input means.

2. In the mobile vehicle of claim 1, said work mechanism being a stump remover.

3. In the mobile vehicle of claim 1, anchor means secured to and extending above and below said tongue;

and fastening means interconnecting said support bar and one anchor means when said support bar is in ground-engaging drive position;

said fastening means adapted to secure said support bar in elevated non-use position to the other anchor means.

4. In the mobile vehicle of claim 1, said power driven means being a hydraulic motor with an output shaft;

and sprocket gears and a chain interconnecting said output shaft and said transmission power driven output shaft.

5. In the mobile vehicle of claim 1, said motive means being a hydraulic pump;

said power driven means being a fluid motor;

an "off" and "on" control and reverse valve;
fluid delivery and return conduits interconnecting said valve and fluid motor;
and a conduit interconnecting said pump and valve.

6. In the mobile vehicle of claim 1, said power drive means being a hydraulic motor with an output shaft;
sprocket gears and a chain interconnecting said output shaft and said transmission power drive output shaft;
said motive means being a hydraulic pump;
a control valve means connected to said pump;
and fluid delivery and return conduits interconnecting said valve and fluid motor.

* * * * *